United States Patent
Matsumoto et al.

(10) Patent No.: US 6,356,311 B1
(45) Date of Patent: Mar. 12, 2002

(54) VIDEO SIGNAL TRANSMISSION APPARATUS

(75) Inventors: Akihiko Matsumoto; Tatsuo Tsukida; Yuichi Ishikawa, all of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 08/989,293

(22) Filed: Dec. 11, 1997

Related U.S. Application Data (63) Continuation of application No. PCT/JP97/01295, filed on Apr. 15, 1997.

(30) Foreign Application Priority Data

Apr. 15, 1996 (JP) ............................ 8-092842

(51) Int. Cl.[7] .......................... H04N 5/06; H04N 7/00; H04N 7/08
(52) U.S. Cl. .................... 348/461; 348/473; 348/512; 386/95
(58) Field of Search ................ 386/95, 111, 112, 386/66, 83, 124; 348/512, 461, 731, 473, 474, 478; 725/114, 116, 117, 115, 138, 144, 91, 93; H04N 5/06, 7/08, 7/00

(56) References Cited

U.S. PATENT DOCUMENTS

| | | | | |
|---|---|---|---|---|
| 5,270,809 A | * | 12/1993 | Gammie et al. | 358/84 |
| 5,515,107 A | * | 5/1996 | Chiang et al. | 348/473 |
| 5,533,021 A | * | 7/1996 | Branstad et al. | 348/512 |
| 5,619,337 A | * | 4/1997 | Naimpally | 386/83 |
| 5,691,986 A | * | 11/1997 | Pearlstein | 370/477 |
| 5,710,815 A | * | 1/1998 | Ming et al. | 380/20 |
| 5,715,176 A | * | 2/1998 | Mobini | 364/514 R |
| 5,767,800 A | * | 6/1998 | Machida et al. | 341/67 |
| 5,822,676 A | * | 10/1998 | Hayashi et al. | 348/12 |
| 5,828,416 A | * | 10/1998 | Ryan | 348/512 |
| 5,991,503 A | * | 11/1999 | Miyasaka | 386/111 |
| 6,006,256 A | * | 12/1999 | Zdepski et al. | 709/217 |

FOREIGN PATENT DOCUMENTS

| | | |
|---|---|---|
| JP | 5-328305 | 12/1993 |
| JP | 8-102905 | 4/1996 |
| JP | 8-279922 | 10/1996 |
| JP | 8-279923 | 10/1996 |

* cited by examiner

*Primary Examiner*—Reinhard J. Eisenzopf
*Assistant Examiner*—Brian P. Yenke
(74) *Attorney, Agent, or Firm*—Frommer Lawrence & Haug LLP; William S. Frommer; Dennis M. Smid (57) ABSTRACT

A video signal transmission apparatus has the encoding means 2, operative when a predetermined unit of video signal is compressively encoded, for multiplexing identification data unique to this video signal in a user data region within an encoded bit stream, and the storing/decoding means 4 for storing the encoded bit stream data having the unique identification data multiplexed therein, and, when transmission is requested from the outside, for decoding the encoded bit stream data and simultaneously reading the multiplexed unique identification data to verify whether it is unique identification data of a video signal to be transmitted.

7 Claims, 9 Drawing Sheets

VIDEO SIGNAL TRANSMISSION APPARATUS

This is a continuation of copending International Application PCT/JP97/01295 having an international filing date of Apr. 15, 1997.

TECHNICAL FIELD

The present invention relates to a video signal transmission apparatus for encoding an input video signal to encoded data in a format represented by MPEG-2 (Moving Picture Image Experts Group phase 2) to store and transmit the encoded data.

BACKGROUND ART

In general, when a video signal is transmitted in a television broadcasting station, confirmation is made as to whether or not the video signal to be transmitted has been transmitted without failure. Conventionally, this confirmation has been achieved in the following way.

First, before transmitting a plurality of kinds of video signals, these plurality of kinds of video signals are once recorded on a video tape or the like in a order in which they are to be transmitted. In this event, identification data unique to the respective video signals are inserted in a VITC (Vertical Interval Time Code: television vertical period) or a LTC (Longitudinal Time Code: a time code recorded on an audio track in a longitudinal direction of a video tape) region.

When these plurality of kinds of video signals are transmitted, the video tape, on which the video signals have been recorded in the transmission or, is reproduced by a VTR for transmission, wherein at every time when one unit of video signal is transmitted, its unique identification data is read in the VTR simultaneously with the transmission. Then, the unique identification data is transferred to a computer which manages the progress of programs, such that the management computer confirms, based on this, whether scheduled video signals have been transmitted without failure. Simultaneously with this, an operator also confirms by monitoring whether or not the scheduled video signals have been actually transmitted without failure.

By the way, when a broadcasting station introduces a multi-channeled broadcasting channel, for example, by the use of a video server, the monitoring of each channel is inconvenient because it requires many hands.

DISCLOSURE OF THE INVENTION

In view of the problem mentioned above, it is an object of the present invention to provide a video signal transmission apparatus which is capable of efficiently performing monitoring operation for a video signal to be transmitted even if multi-channeled broadcasting is introduced in a broadcasting station.

A video signal transmission apparatus according to the present invention has an encoding means, operative when a predetermined unit of a video signal is compressively encoded, for multiplexing identification data unique to this video signal in a user data region within an encoded bit stream, and storing/decoding means for storing the encoded bit stream data having the unique identification data multiplexed therein, and, when transmission is requested from the outside, for decoding the encoded bit stream data and simultaneously reading the multiplexed unique identification data to verify whether or not it is unique identification data of a video signal to be transmitted.

According to the present invention, when a video signal is compressively encoded, unique identification data is multiplexed in a certain user data region within a compressively encoded bit stream, such that this unique identification data is read and compared when the video signal is transmitted, thereby making it possible to automatically confirm whether or not the video signal has been transmitted in accordance with a play list. Thus, even when the multi-channel broadcasting is introduced in a broadcasting station, it is possible to efficiently perform the verifying operation of the unique identification data in a video data to be transmitted.

BEST MODE FOR CARRYING OUT THE INVENTION

An example of a video signal transmission apparatus according to the present invention will hereinafter be described with reference to the drawings.

Figure 1:
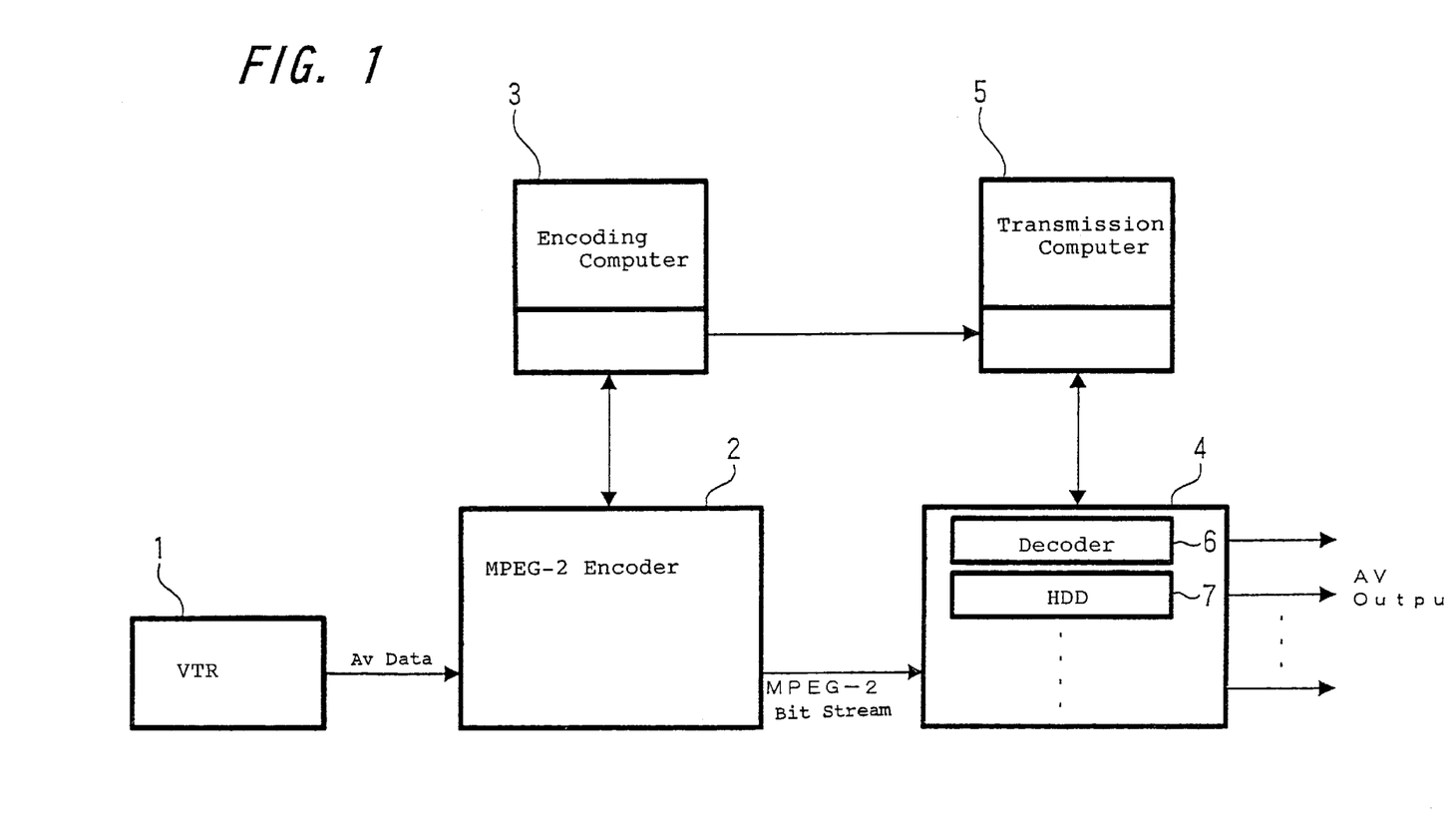
FIG. 1 is a configuration diagram illustrating an example of an video signal transmission apparatus according to the present invention.

FIG. 1 illustrates the configuration of a video signal transmission apparatus according to the present example. In FIG. 1, reference numeral 1 designates a video tape recorder (VTR) for supplying a video signal to be broadcast, and the video signal from the VTR 1 is supplied to an MPEG-2 encoder 2.

The MPEG-2 encoder 2 encodes the inputted video signal to MPEG-2 bit stream data in accordance with an instruction from an encoding computer 3. As is well known, the MPEG-2 (Moving Picture Image Coding Experts Group Phase 2) is a compression scheme for video and audio, the standardization of which has been promoted by an ISO (International Standard Organization) in company with an IEC (International Electric Committee). The compression of video is based on a DCT, and the compression ratio is improved by using not only intra-frame correlation but also a technique called "motion compensation" taking advantage of inter-frame correlation. An MPEG-1, which has been developed mainly for purposes of recording video on an audio CD, compresses an image composed of 350 pixels× 240 pixels to 1.5 Mbps or less. The MPEG-2 compresses an image of 720 pixels×480 pixels to 15 Mbps or less with a goal to accomplish an image quality similar to that of the television broadcasting.

In this example, when the MPEG-2 encoder 2 encodes one clip of video signal (a unit of video signal having similar contents, for example, one piece of commercial or the like) to a MPEG-2 bit stream, the encoding computer 3 issues an instruction to the MPEG-2 encoder 2 to provide every clip of video signal with unique identification data, and sends the unique identification data to be provided. Simultaneously with this, the encoding computer 3 notifies a transmission computer 5, later described, of unique identification data given to each clip and the name of the clip.

The MPEG-2 encoder 2, upon receiving the above-mentioned unique identification data from the encoding computer 3, multiplexes the unique identification data in a certain user data region within the bit stream when encoding.

Reference numeral 5 designates the transmission computer which stores the unique identification data and clip names for respective clips sent thereto from the encoding computer 3, and instructs (sends a transmission command to) a video server 4, later described, to transmit a specific clip in accordance with a previously prepared play list (a transmission schedule file on which the names of clips to be transmitted and transmission times are scheduled).

Reference numeral 4 designates the video server which comprises a HDD (hard disk drive) 7 for storing bit stream data sent thereto from the MPEG-2 encoder 2, and a decoder 6 for decoding the bit stream data accumulated in the HDD 7 before transmission. Since A/V (Audio, Video) data are outputted in a multi-channel scheme from the video server in this example, the number of decoders 6 and HDDs 7 provided may equal the number of channels. However, in the figure, those for only one channel are illustrated, with the remaining being omitted.

The video server 4, upon receiving a transmission command from the transmission computer 5, reads MPEG-2 bit stream data corresponding to a specified clip from the HDD 7, and decodes the bit stream data with the decoder 6. In this event, the decoder 6 extracts the unique identification data multiplexed in the bit stream and returns the extracted unique identification data to the transmission computer 5.

The transmission computer 5 compares the unique identification data returned from the video server 4 with the unique identification data previously sent from the encoding computer 3 and stored in the transmission computer 5, thereby confirming whether or not a scheduled program (clip) has been actually transmitted as scheduled.

Figure 2:
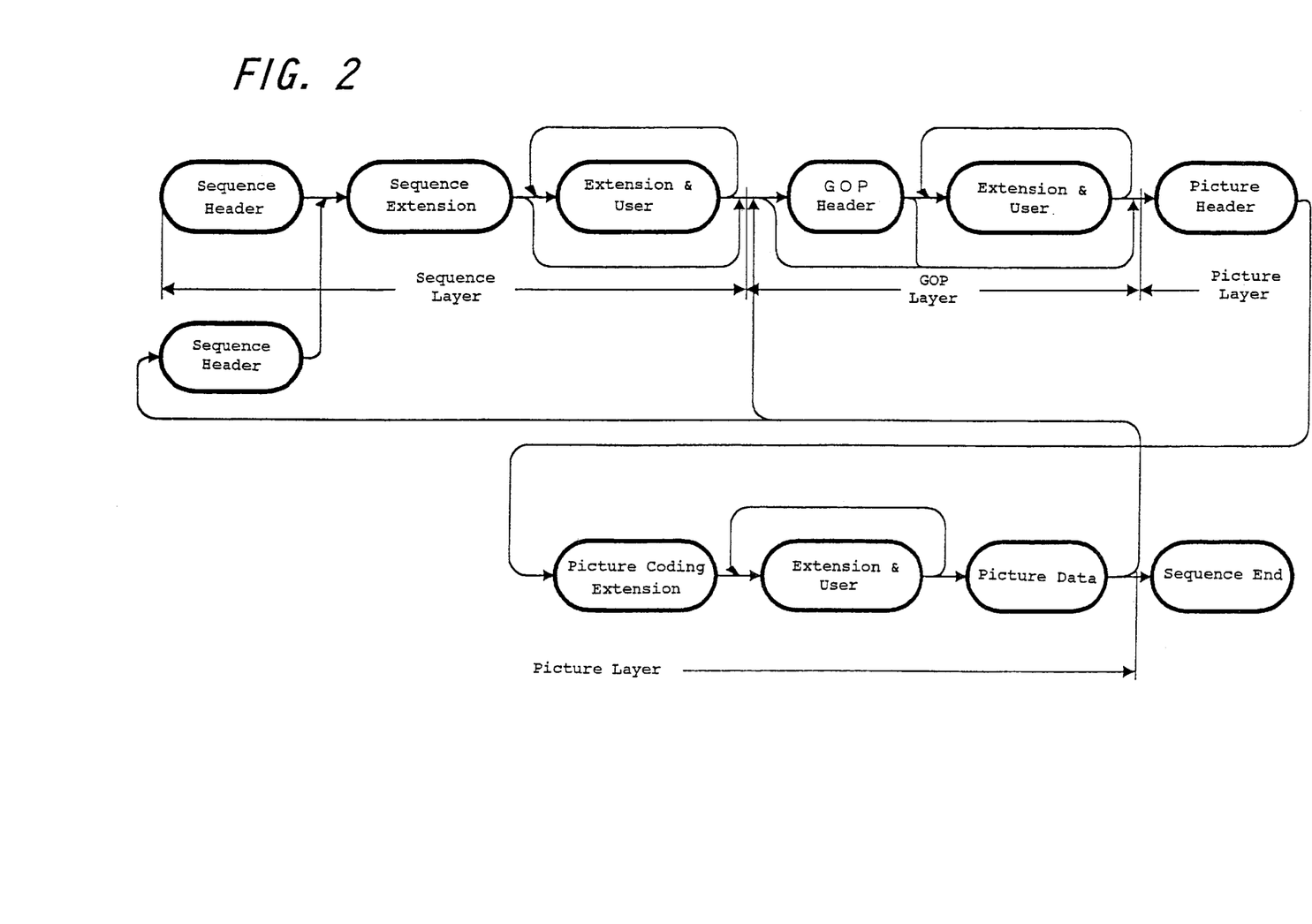
FIG. 2 is a diagram illustrating a structure of a MPEG-2 bit stream.

The structure of the known MPEG-2 bit stream, as illustrated in FIG. 2, is composed of a sequence layer comprising a sequence header region, a sequence extension region and an extension and user data region, a GOP (group of picture) layer comprising a GOP header region, an extension and user data region, and a picture layer comprising a picture header region, a picture coding extension region and an extension and user data region, and a picture data region.

The sequence layer, the GOP layer, and the picture layer have the user data regions respectively, such that the unique identification data is inserted into any of these user data regions, in the GOP layer into this example, as an 8-bit ASCII code.

Figure 3:
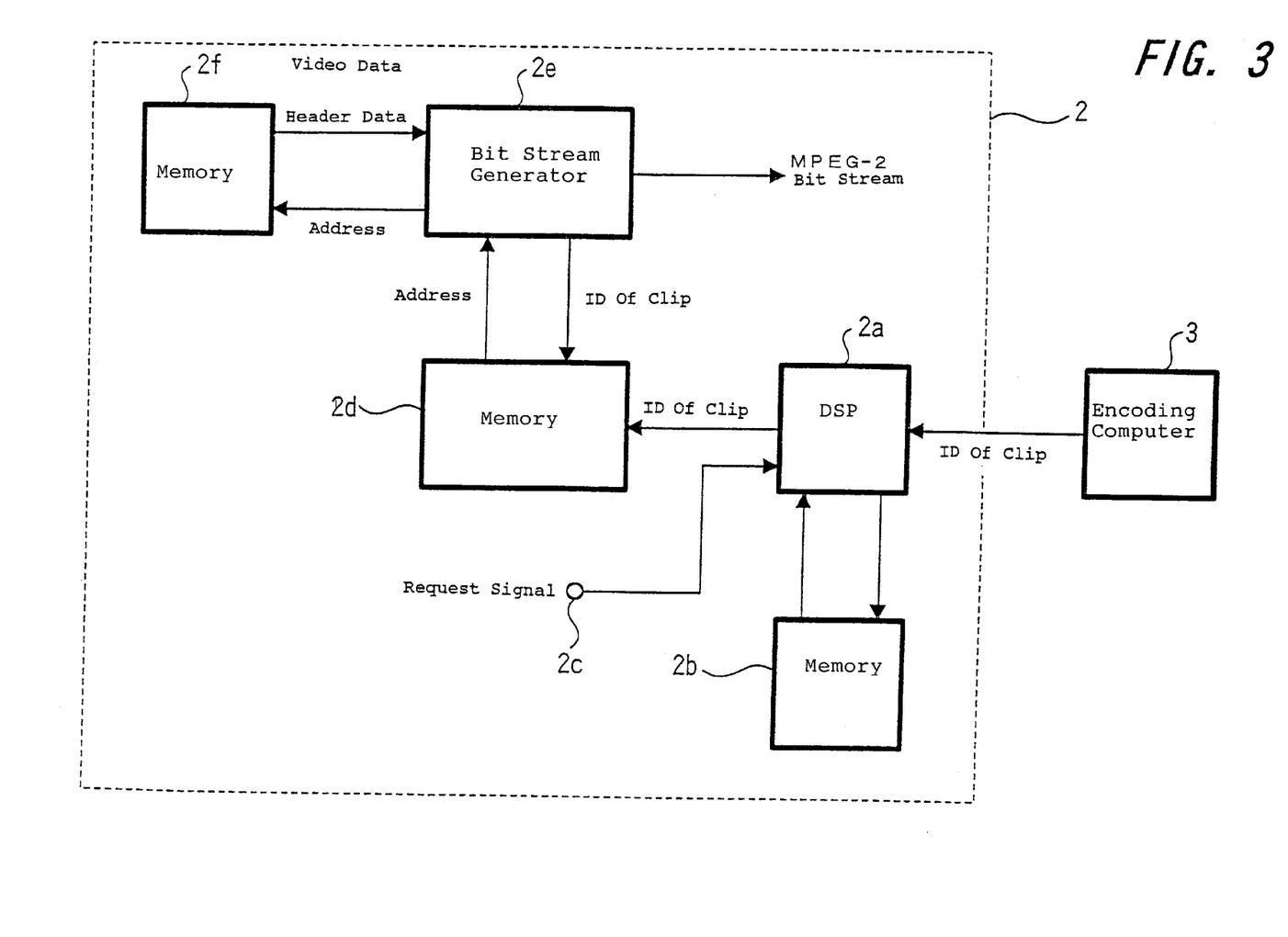
FIG. 3 is a configuration diagram illustrating an example of an MPEG-2 encoder.

A configuration for multiplexing the unique identification data in the above-mentioned MPEG-2 bit stream data as well as operations associated therewith will be described in detail with reference to a functional block diagram for the encoder 2 of FIG. 3, a processing flow chart of the encoding computer 3 of FIG. 4, and a processing flow chart in the encoder 2 of FIG. 5.

Figure 4:
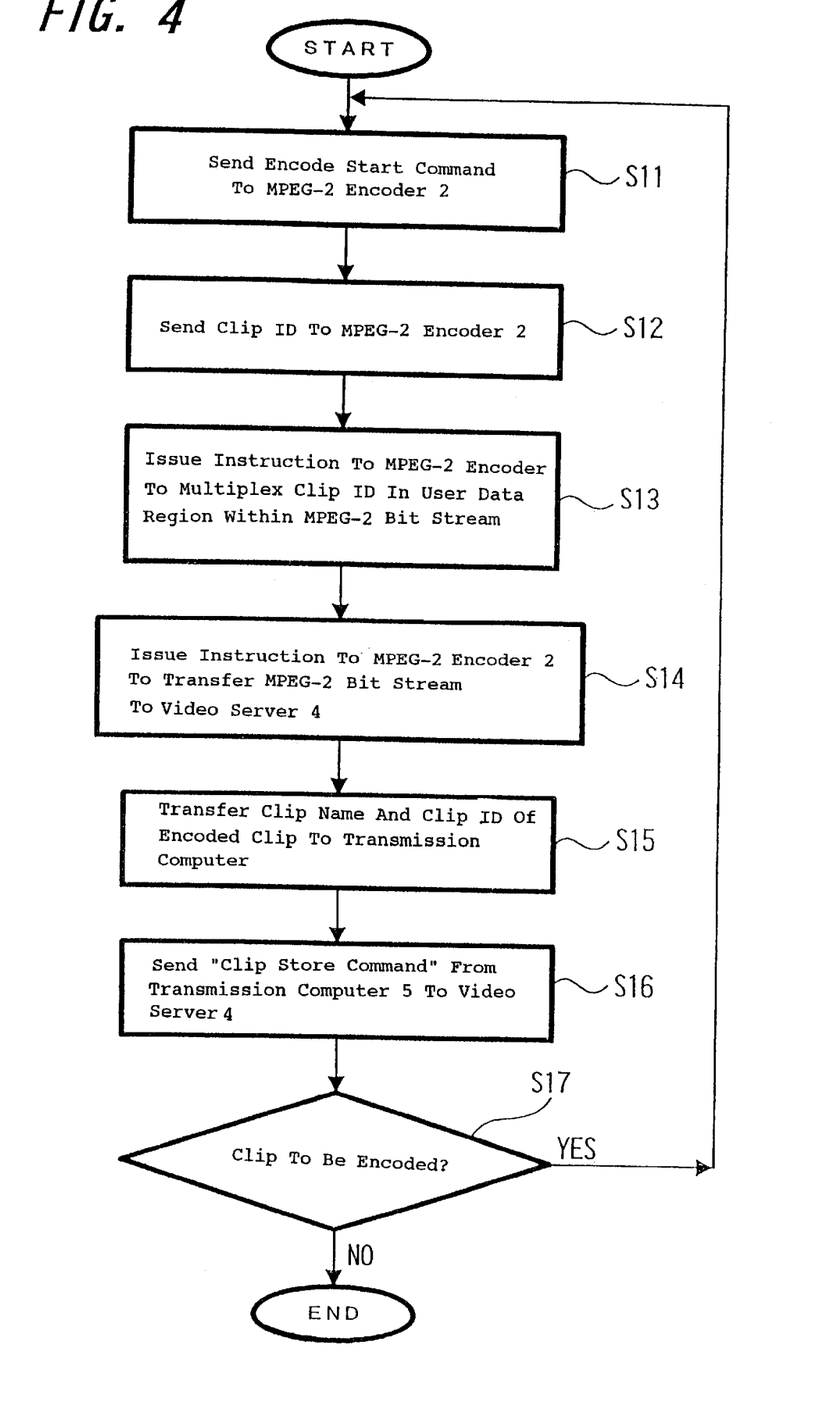
FIG. 4, FIG. 5, FIG. 7, FIG. 8, FIG. 9, and FIG. 10 are flow charts used for explaining the present invention, respectively.
Figure 5:
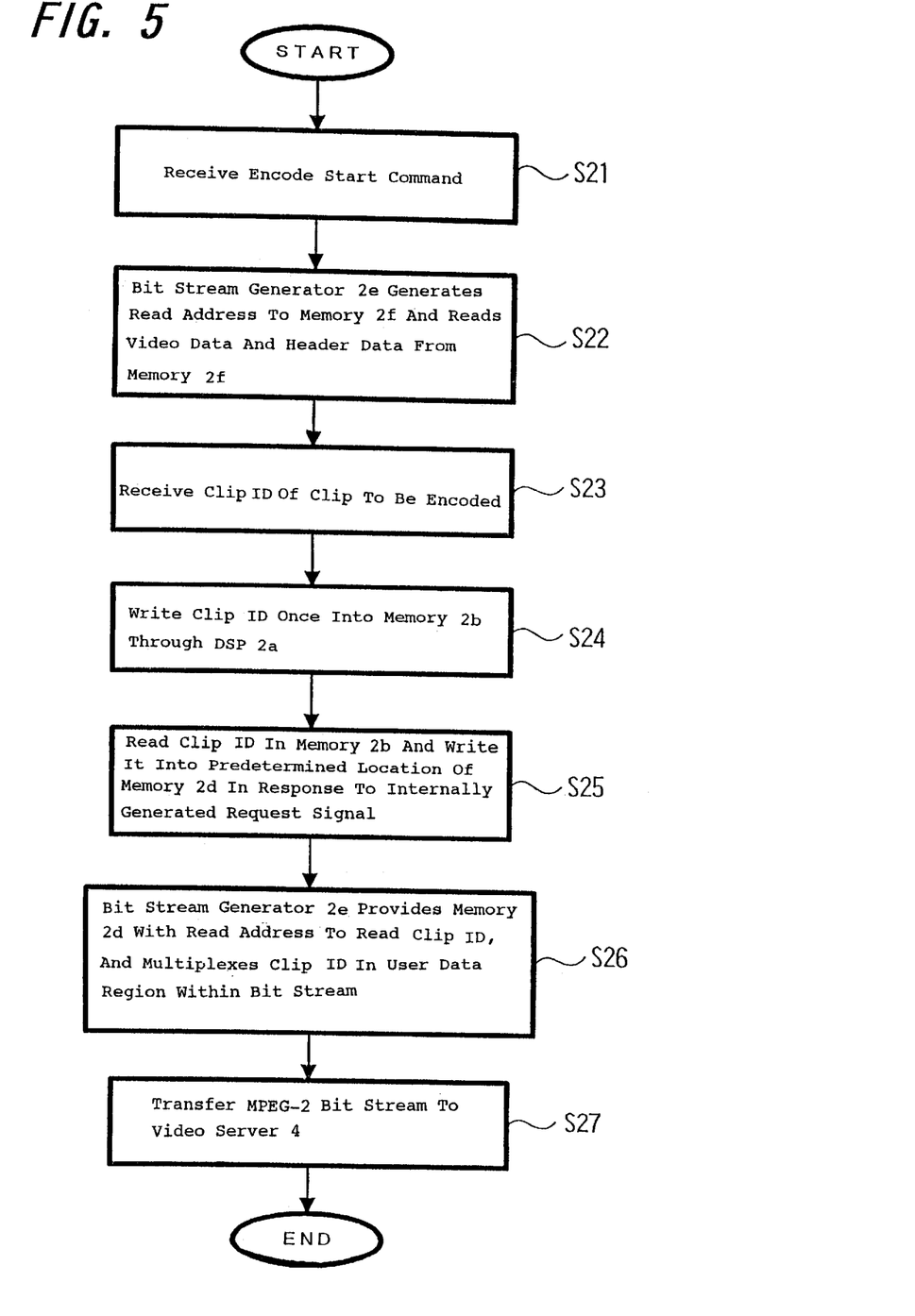

First, as illustrated as step S11 in FIG. 4, the encoding computer 3 issues an encode start command to the MPEG-2 encoder 2. In the encoder 2 which has received the encode start command (step S21), video data and header information required for compression encoding therefore are fetched from the external VTR 1 or the like into a memory 2f. Next, a bit stream generator 2e generates a read address to the memory 2f, and the memory 2f reads video data and header information stored in the given read address which are returned to the bit stream generator 2e. Then, bit stream data conforming to the MPEG-2 standard is formed in the bit stream generator 2e (step S22).

Next, the encoding computer 3 sends unique identification data (clip ID) corresponding to the clip data to be encoded to the encoder 2 (steps S12, S23). The unique identification data (clip ID) in this example is in the form of 8-bit ASCII data which is supplied from a CPU 3 (corresponding to the encoding computer 3) in FIG. 3 through a digital signal processor (DSP) 2a, and once written into a memory 2b (step S24). This operation must have been completed at a timing of two frames before, at which the reading of the clip data actually begins from the memory 2f to the bit stream generator 2e, when the clip data is fetched from the external VTR 1 or the like into the memory 2f of the encoder 2 and is formed as a bit stream in the bit stream generator 2e. Then, video data is encoded.

Next, the unique identification data (clip ID) written in the memory 2b is generated within a PLD (Programmable Logic Device) at a predetermined time, and read out and written into a predetermined location (predetermined address) of a memory 2d in response to a signal supplied from a request signal input terminal 2c as a request signal (step S25). This request signal is generated at a timing of one frame before at which the fetching of clip data begins. Also in FIG. 3, while the memory 2d and the memory 2f are composed of a plurality of memories, they may be implemented by a single memory.

Next, the encoding computer 3 issues an instruction to the encoder 2 to multiplex the clip ID in a user data region within the MPEG-2 bit stream (step S13). The bit stream generator 2e also provides the memory 2d with a read address as is the case of generating one for the memory 2f, to read unique identification data (clip ID) written in the memory 2d. Then, the unique identification data (clip ID) read from the memory 2d is multiplexed in the user data region of the GOP layer within the bit stream data created by encoding the video data read from the memory 2f (step S26).

After creating the MPEG-2 bit stream data, the encoding computer 3 issues an instruction to transfer the MPEG-2 bit stream data to the video server 4 (step S14).

The encoder 2 outputs the MPEG-2 bit stream data to the video server 4 as instructed (step S27).

Simultaneously with this, the encoding computer 3 transfers the clip name of the encoded clip data and the unique identification data (clip ID) multiplexed therein to the transmission computer 5 (step S15). Then, a "clip store command" is sent to the transmission computer 5 to store the bit stream of the clip, which is now to be sent, in the video server (step S16). The encoding computer 3 determines whether or not there is a clip to be next encoded (step S17). The processing is terminated (END) if there is no clip to be next encoded, and the processing is repeated if any.

Next, a configuration for storing the MPEG-2 bit stream data with the unique identification data (clip ID) multiplexed therein in the HDD 7 and for retrieving the unique identification data (clip ID) for comparison when the bit stream data is decoded, as well as operations associated therewith will be described with reference to FIGS. 6–10.

Figure 7:
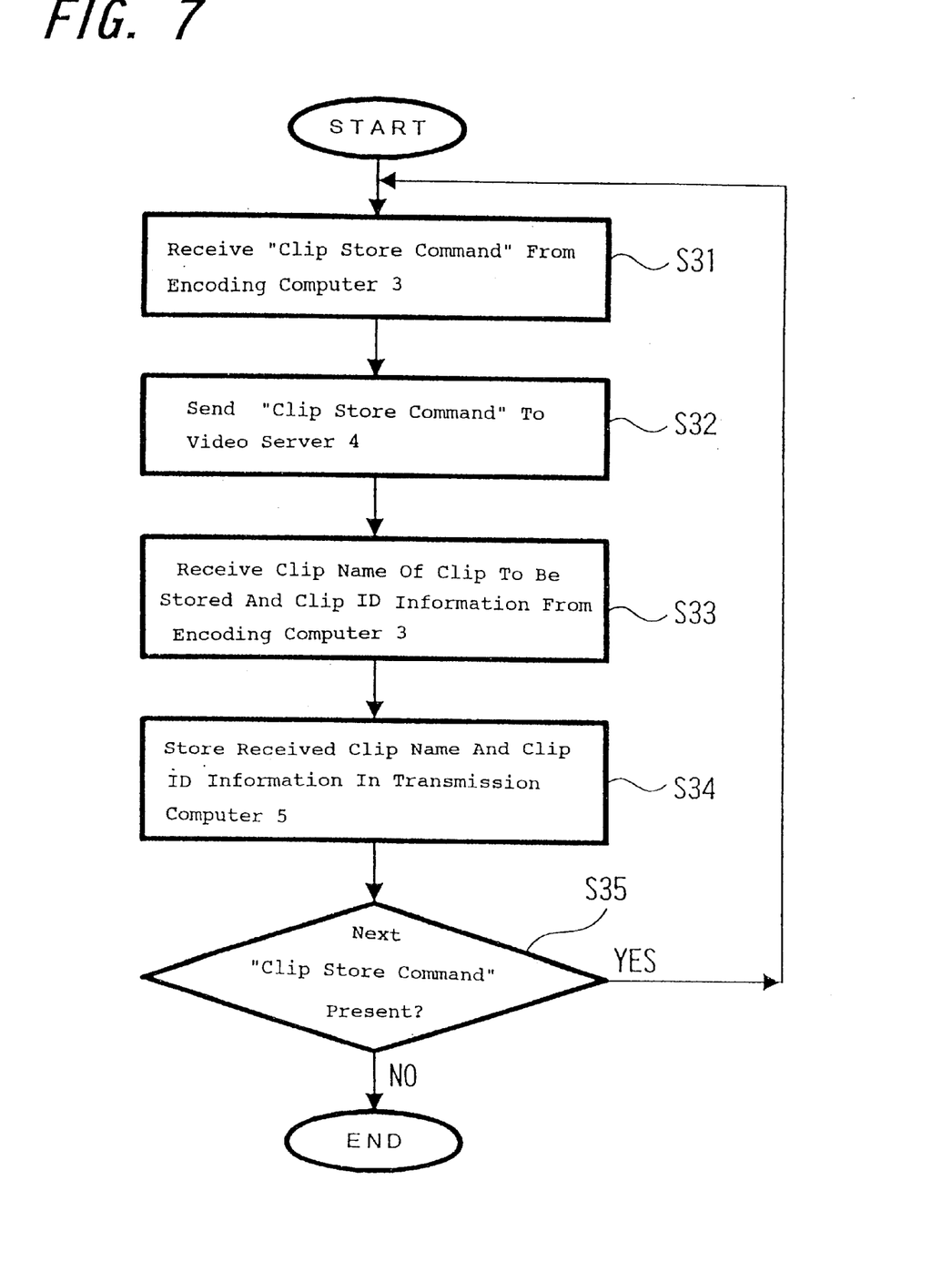

First described is a process of storing the bit stream data in the HDD 7. The transmission computer 5 receives a "clip store command" from the encoding computer 3 (step S31), and sends a "clip store command" to the video server 4 (step S32). Subsequently, "clip name" and "clip ID" information related to the clip to be stored is received from the encoding computer 3 (step S33) and stored in the transmission computer 5 (step S34). The transmission computer 5 sequentially determines whether or not there is a subsequent "clip store command" (step S35), and repeats the foregoing if there is one, and terminates the processing if not (END).

Figure 6:
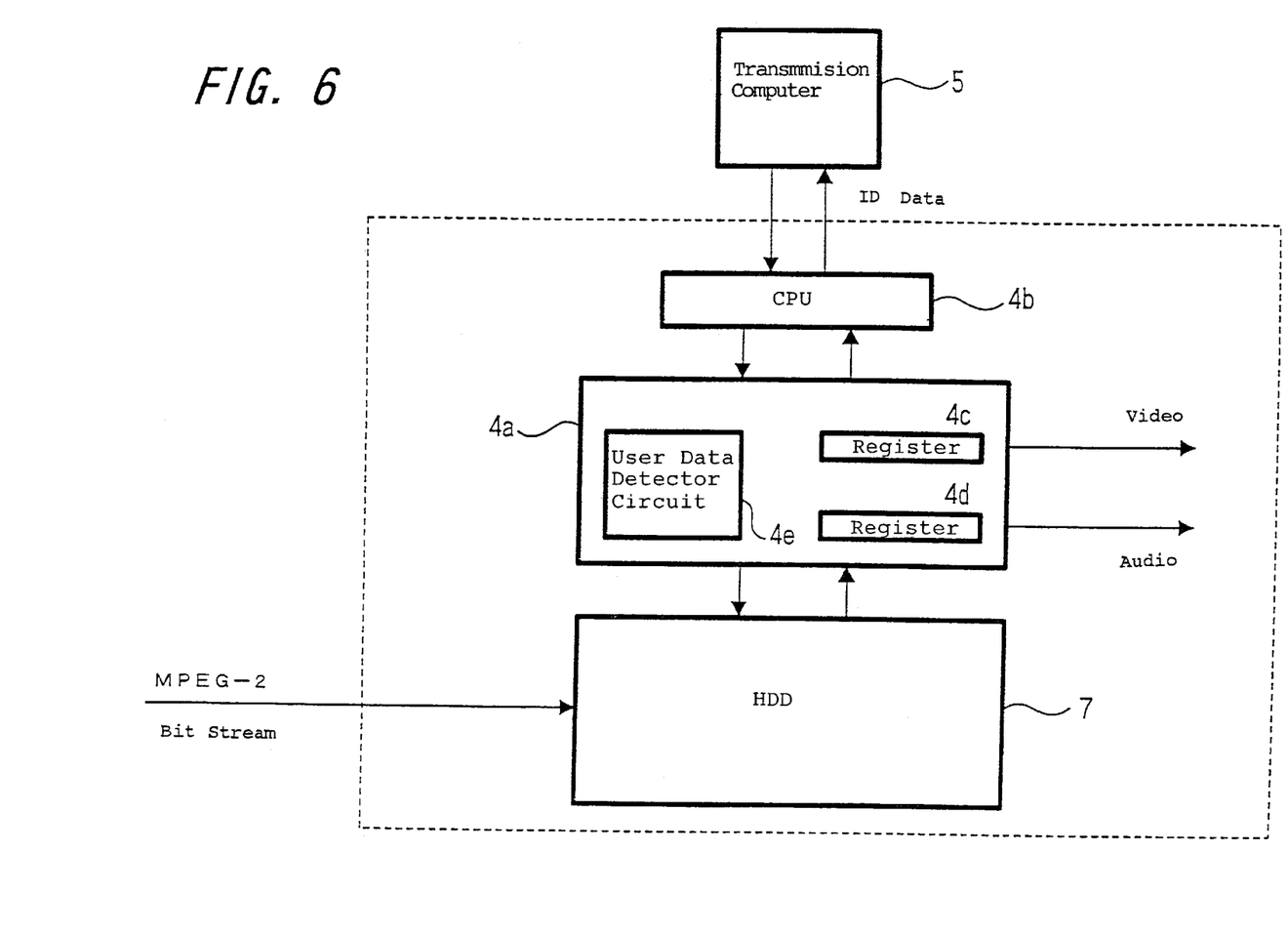
FIG. 6 is a configuration diagram illustrating an example of a video server.
Figure 8:
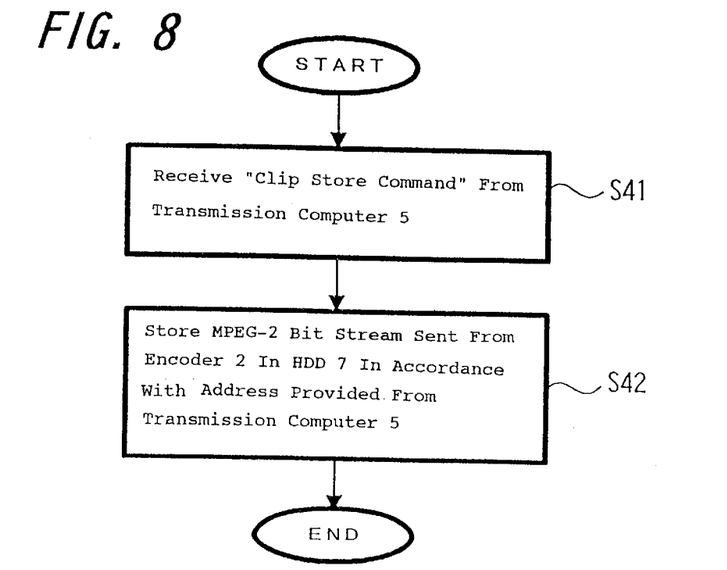

In the video server 4, a CPU 4b receives the "clip store command" from the transmission computer 5 (step S41), and stores a specified clip in the HDD 7 (step S42).

Next described is a processing process for decoding the specified MPEG-2 bit stream data to transmit it as a video signal from the video server 4.

Figure 9:
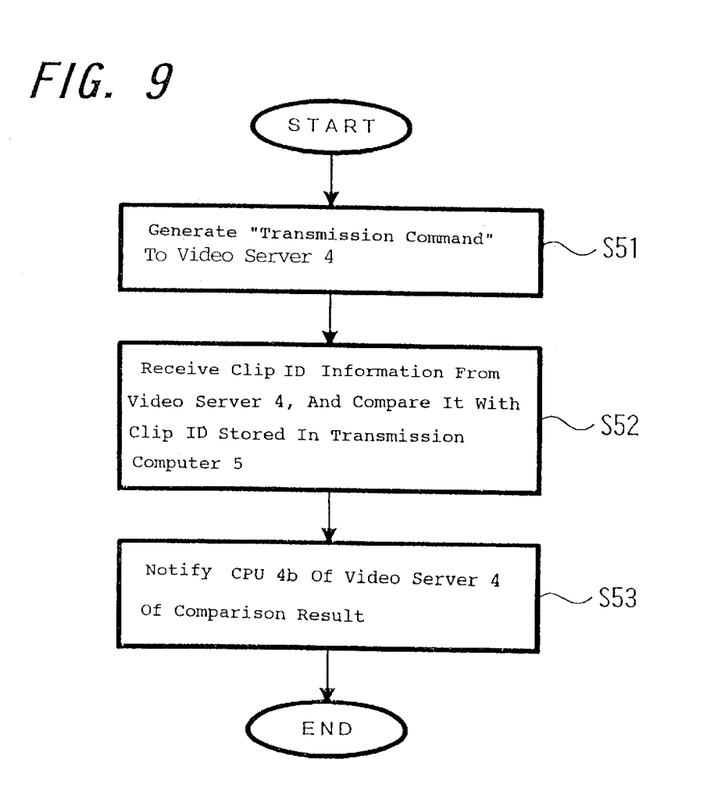

The transmission computer 5 generates a "transmission command" to the video server 4 (step S51).

Figure 10:
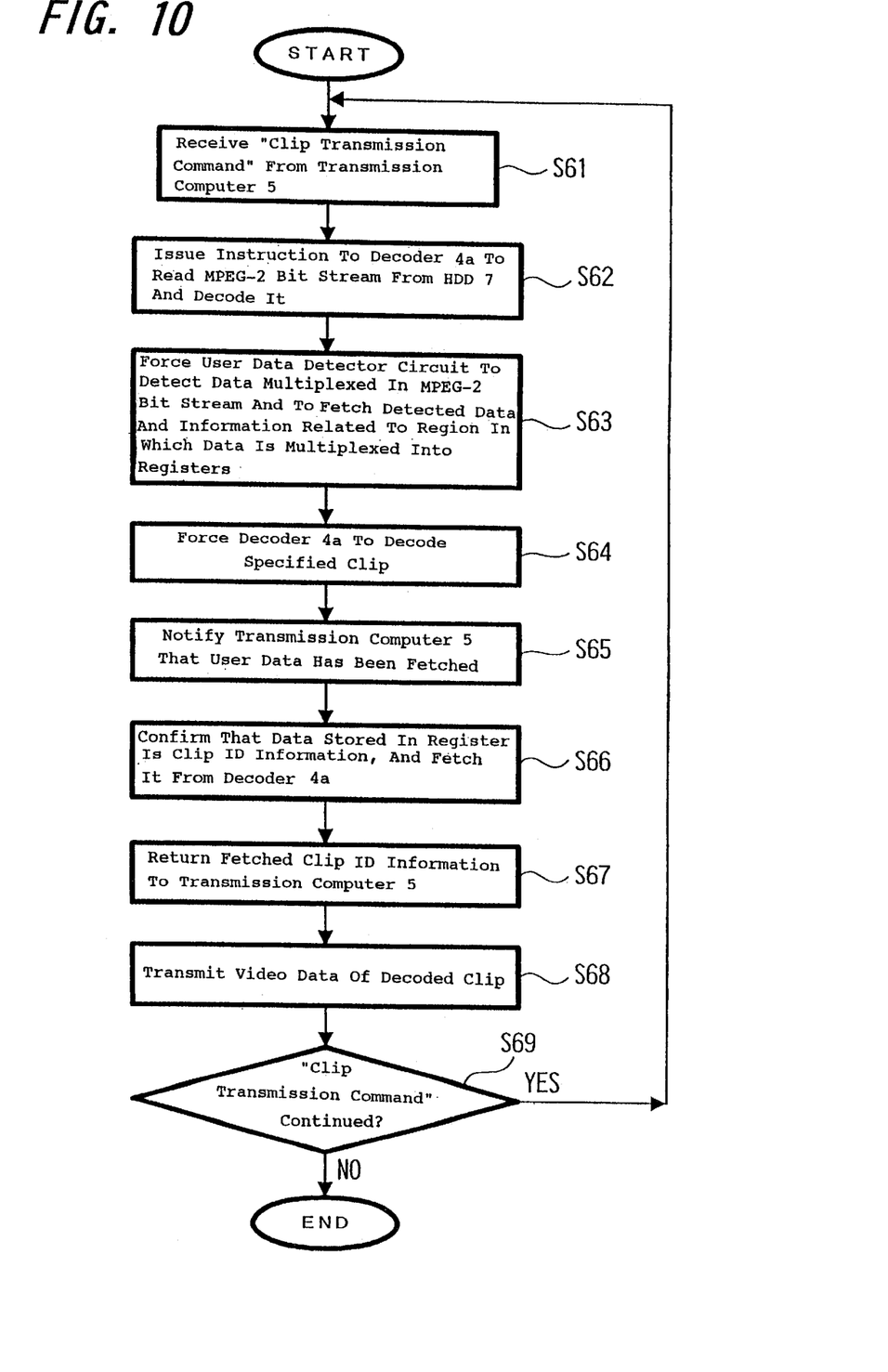

In the video server 4, the CPU 4b, after receiving a "clip transmission command" from the transmission computer 5 (step S61), issues an instruction to a decoder 4a to read the specified MPEG-2 bit stream data from the HDD 7 and decode the same (step S62). A user data detector circuit 4e within the decoder 4a, upon detecting user data within the MPEG-2 bit stream data read from the HDD 7, stores the detected data in a register 4c and information related to the user data region, in which the detected data has existed, in a register 4d, respectively (step S63). Then, the decoder 4a decodes the MPEG-2 bit stream data as instructed (step S64). The CPU 4b notifies the transmission computer 5 that the data has been fetched into the registers 4c, 4d, respectively (step S65). Subsequently, the CPU 4b, when confirming that the data stored in the register 4c is clip ID information based on the information stored in the register 4d, fetches the data (clip ID) stored in the register 4c from the decoder 4a (step S66). Then, the CPU 4b returns the fetched clip ID to the transmission computer 5 (step S67), and transmits the decoded video data (step S68). Subsequently, it is determined whether or not the "clip transmission command" continues (step S69). The foregoing is repeated if it continues, and the processing is terminated (END) if it does not continue.

The transmission computer 5, upon receiving the clip ID information from the video server 4, compares it with the clip ID stored in the transmission computer 5 (step S52), and notifies the CPU 4b of the video server 4 of the comparison result (step S53). Although not shown particularly in the flow, the comparison result may be used to perform processing, for example, to stop the transmission, notify the destination that errors are included, or the like "if discrepancy occurs".

According to the present example as described above, when a video signal is encoded to MPEG-2 bit stream data as a compressed code by the MPEG-2 encoder, unique identification data is inserted into user data in this MPEG-2 bit stream such that this unique identification data is read and compared when this video data is transmitted from the video server 4, thereby making it possible to automatically confirm from the comparison whether or not the video data has been transmitted in accordance with a play list. Thus, even when multi-channel broadcasting is introduced in a broadcasting station, there is a benefit that the comparison operation of the unique identification data in a video data to be transmitted can be efficiently performed.

It goes without saying that the present invention is not limited to the foregoing embodiment, and a variety of other configurations can be employed without departing from the gist of the present invention.

What is claimed is:

1. A video signal transmission apparatus being characterized by comprising:

encoding means having an encoding unit, operative when a predetermined unit of video signal is compressively encoded, for multiplexing identification data unique to said video signal in a user data region within an encoded bit stream and having an encoding control unit for substantially simultaneously providing the identification data unique to said video signal to said encoding unit and a storing/decoding control unit; and storing/decoding means having the storing/decoding control unit for storing said encoded bit stream data having said unique identification data multiplexed therein, and, when transmission is requested, for decoding said encoded bit stream data and comparing the identification data received from said encoding control unit and said multiplexed unique identification data to verify whether it is unique identification data of a video signal to be transmitted.

2. A video signal transmission apparatus according to claim 1, characterized in that:

said compression encoding is MPEG-2 compression encoding.

3. A video signal transmission apparatus according to claim 1, wherein said encoding unit is a compressive encoding unit for compressively encoding said predetermined unit of video signal and for multiplexing identification data unique to said video signal in a user data region within an encoded bit stream; and wherein said encoding control unit is a compressive encoding control unit.

4. A video signal transmission apparatus according to claim 1, wherein the storing and decoding means includes a storing/decoding unit for storing said encoded bit stream data having said unique identification data multiplexed therein, and, when transmission is requested, for decoding said encoded bit stream data and detecting said multiplexed unique identification data; and wherein the storing/decoding control unit transmits a video signal transmission request to said storing/decoding unit and compares the identification data received from said encoding control unit and unique identification data detected by said storing/decoding unit to verify whether it is unique identification data of a video signal to be transmitted.

5. A video signal transmission apparatus according to claim 1, characterized in that;

said identification data unique to the video signal, which is multiplexed in said encoded bit stream, is a 8-bit ASCII data.

6. A video signal transmission apparatus characterized by comprising:

encoding means formed of a compressive encoded unit, operative when a predetermined unit of video signal is compressively encoded in accordance with MPEG-2, for multiplexing identification data unique to said video signal in a user data region within an encoded bit stream, and a compressive encoding control unit for substantially simultaneously transferring identification data unique to said predetermined unit of video signal to said compressive encoding unit and to a storing/decoding control unit; and storing/decoding means formed of a storing/decoding unit for storing said encoded bit stream data having said unique identification data multiplexed therein and, when transmission is requested, for decoding said encoded bit stream data and for detecting said multiplexed unique identification data, and the storing/decoding control unit for transmitting a video signal transmission request to said storing/decoding unit and for receiving the identification data from the compressive encoding control unit and the unique identification data detected by said storing/decoding unit to verify whether it is unique identification data of a video signal to be transmitted.

7. A video signal transmission apparatus characterized by comprising:

an encoding means formed of a compressive encoded unit, operative when a predetermined unit of video signal is compressively encoded in accordance with MPEG-2, for multiplexing identification data unique to said video signal in a user data region within an encoded bit stream, and a compressive encoding control unit for transferring identification data unique to said predetermined unit of video signal to said compressive encoding unit; and a storing/decoding means formed of a storing/decoding unit for storing said encoded bit stream data having said unique identification data multiplexed therein and, when transmission is requested, for decoding said encoded bit stream data and for detecting said multiplexed unique identification data, and a storing/decoding control unit for transmitting a video signal transmission request to said storing/decoding unit and for receiving unique identification data detected by said storing/decoding unit to verify whether it is unique identification data of a video signal to be transmitted, wherein said compressive encoding control unit, when transmitting a compressive encoding request to said compressive encoding unit, sends identification data unique to said video signal to be multiplexed to said compressive encoding unit, and simultaneously notifies said storing/decoding control unit of the same identification data unique to said video signal which has been sent to said compressive encoding unit.

* * * * *